United States Patent [19]
Richter

[11] Patent Number: 5,996,950
[45] Date of Patent: Dec. 7, 1999

[54] SUCTION CUP MOUNTING ARRANGEMENT

[76] Inventor: Herbert Richter, Drosselweg 8, 75331 Engelbrand, Germany

[21] Appl. No.: 09/027,802

[22] Filed: Feb. 23, 1998

Related U.S. Application Data

[63] Continuation-in-part of application No. 08/972,282, Nov. 18, 1997, abandoned, which is a continuation-in-part of application No. 08/788,550, Jan. 24, 1997, abandoned.

[30] Foreign Application Priority Data

Nov. 22, 1996 [DE] Germany .......................... 196 48 401

[51] Int. Cl.⁶ .................................................. A45D 42/14
[52] U.S. Cl. .................................... 248/205.5; 248/205.8; 248/206.2; 248/291.1; 248/288.11; 428/167; 428/172
[58] Field of Search .............................. 248/205.3, 205.4, 248/205.5, 205.8, 206.2, 206.3, 206.4, 683, 363, 346.11, 349.1, 539, 310, 418, 415, 205.2, 292.12, 289.11, 188.8, 521, 371, 372.1, 291.1, 622, 664, 288.11; 403/52, 66, 68; 24/114.2, 304, 114.6, DIG. 11, 113 MP, 103; 52/297; 224/559, 547, 901, 929, 483; 428/167, 172

[56] References Cited

U.S. PATENT DOCUMENTS

| | | | |
|---|---|---|---|
| 1,736,669 | 11/1929 | Powell et al. | 248/310 |
| 1,766,828 | 6/1930 | Mulroney | 248/205.5 X |
| 2,968,460 | 1/1961 | Van Dusen | 248/205.3 |
| 3,004,745 | 10/1961 | Wilson | 248/349.1 |
| 3,239,178 | 3/1966 | Pompa | 248/205.3 |
| 3,455,531 | 7/1969 | Baker | 248/349.1 |
| 3,524,215 | 8/1970 | Kurtz | 248/205.3 X |
| 3,524,614 | 8/1970 | Sorth | 248/346.11 X |
| 4,040,549 | 8/1977 | Sadler | 248/346.11 X |
| 4,309,011 | 1/1982 | Spector | 248/205.3 |
| 4,546,946 | 10/1985 | Jenison | 248/346.11 |
| 4,659,053 | 4/1987 | Holley et al. | 248/371 X |
| 5,553,908 | 9/1996 | Shink | 248/205.9 X |

FOREIGN PATENT DOCUMENTS

| | | | |
|---|---|---|---|
| 1373506 | 8/1964 | France | 248/205.3 |

Primary Examiner—Ramon O. Ramirez
Assistant Examiner—Stephen S. Wentsler
Attorney, Agent, or Firm—Klaus J. Bach

[57] ABSTRACT

In an assembly for supporting an article on a support surface, a suction cup mounting arrangement is provided including a plastic disc having a smooth unyielding surface on one side for holding a suction cup on the one side and a structure for mounting the support plate to the support surface where a suction cup could otherwise not be attached.

11 Claims, 6 Drawing Sheets

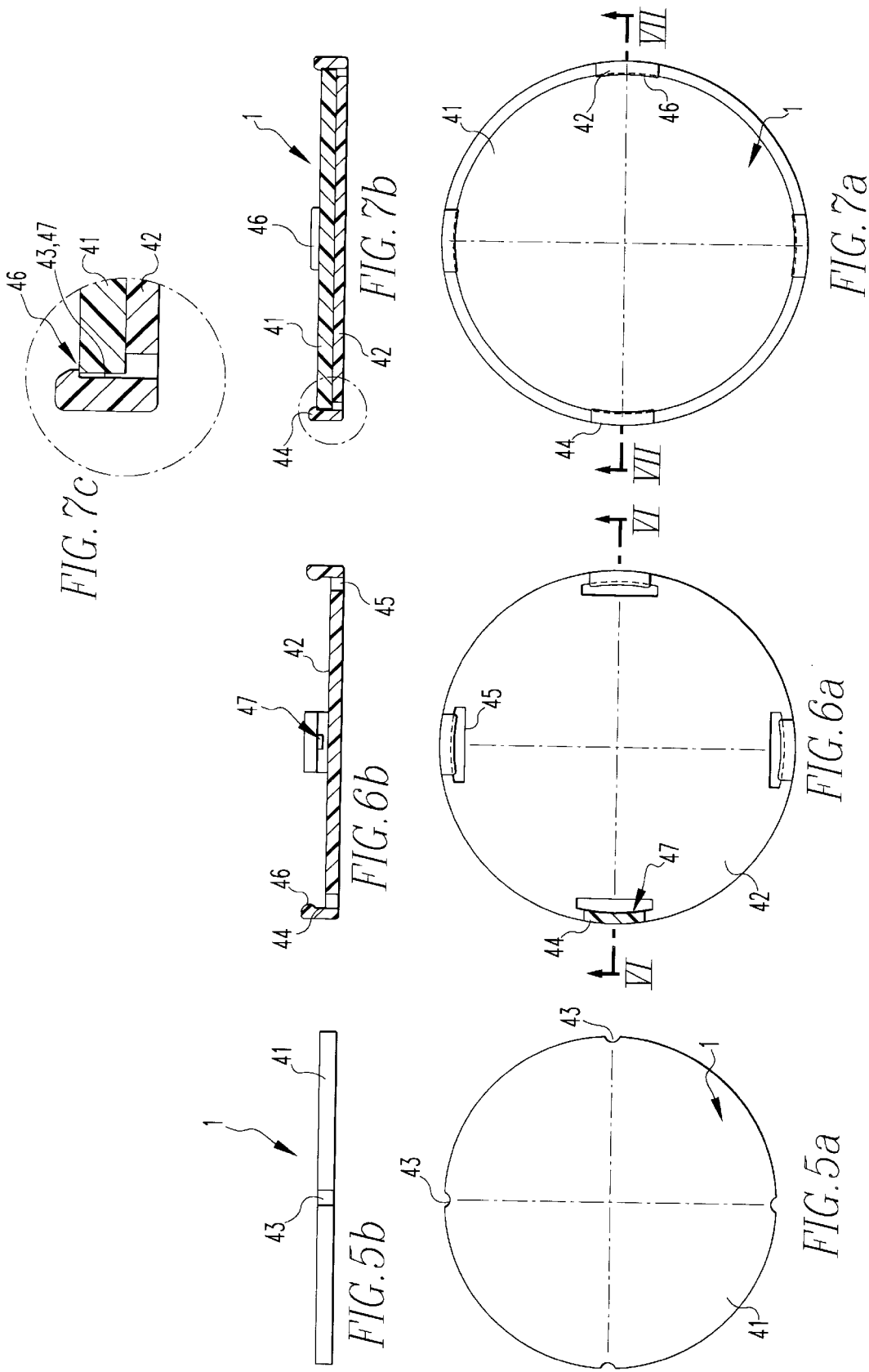

SUCTION CUP MOUNTING ARRANGEMENT

This is a Continuation-In-Part application of patent application Ser. No. 08/972,282 filed Nov. 18, 1997, now abandoned, which is a Continuation-In-Part application of patent application Ser. No. 08/788,550 filed Jan. 24, 1997, now abandoned, and claiming the priority of German application 196 48 401.4 of Nov. 21, 1996.

BACKGROUND OF THE INVENTION

The invention relates to a suction cup mounting arrangement for mounting devices requiring the use of a suction cup to surfaces not generally amenable to the direct application of a suction cup.

Many devices, for the purposes of versatility or portability, require the use of a suction cup for temporary, yet firm, mounting. Suction cups require a smooth, unyielding surface in order to create a tight seal for suction. Sometimes, such surfaces are not available or just not convenient for mounting a suction cup wielding device. In particular, automobiles, for which quite a few such devices are made, generally have no smooth surface other than a windshield. Windshields are, however, often inconvenient for mounting such a device since they are sometimes too far in front of the driver for a convenient reach. Also, mounting such a device on the windshield can block the driver's view. Dashboards, as well as other locations, are usually an ideal location to mount the device, however, their surfaces are often textured and are not ideal for holding suction cups.

It is the object of the present invention to provide a mounting surface arrangement for suction cups to permit their mounting on surfaces to which suction cups could not normally be attached.

SUMMARY OF THE INVENTION

In a suction cup mounting arrangement, a plastic disc having opposite sides with a smooth unyielding surface on one side, is provided for attaching a device using a suction cup on the one side and means are provided for mounting the disc to another surface where a suction cup could otherwise not be attached.

With the arrangement according to the invention, devices using suction cups for a temporary mounting can be mounted anyplace where the plastic disc can be mounted.

Various features and advantages of the invention will become apparent from the following description of the invention on the basis of the accompanying drawings.

BRIEF DESCRIPTION OF THE DRAWINGS

FIG. 3b is a cross-sectional view taken along line III—III of FIG. 3a,

FIG. 4b shows a suction cup holder for accommodating the suction cup of FIG. 4a

FIG. 5a is a top view of a circular suction cup support plate, FIG. 5b is a side view of the suction cup support plate shown in FIG. 5a, FIG. 6a is a top view of a mounting plate for supporting the suction cup support plate of FIGS. 5a and 5b, FIG. 6b is a cross-sectional view taken along line VI—VI of FIG. 6a, FIG. 7a is a top view of a suction cup mounting arrangement showing the suction cup support plate of FIGS. 5a and 5b mounted on the monting plate of FIGS. 6a and 6b, FIG. 7b is a cross-sectional view taken along line VII—VII of FIG. 7a, and FIG. 7c is an enlarged view of the area circled in FIG. 7b.

DESCRIPTION OF A PREFERRED EMBODIMENT

Figure 1A:
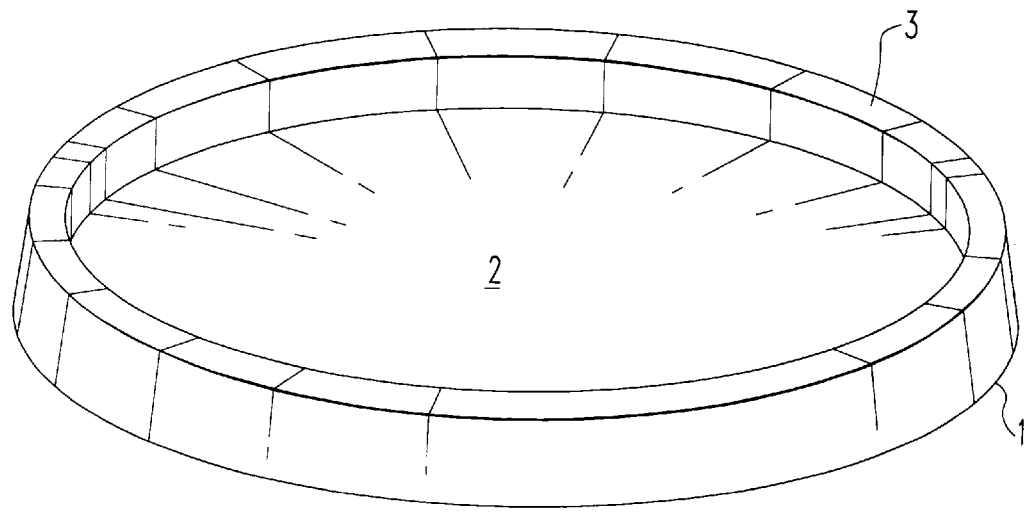
FIG. 1a is a perspective view of a suction cup mounting disc.
Figure 1B:
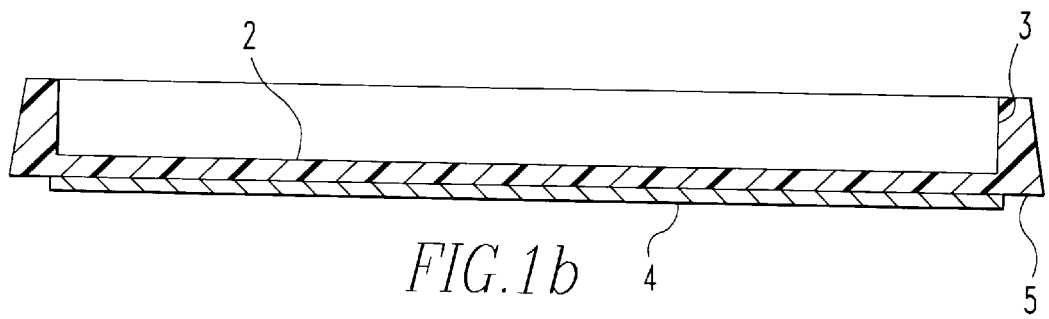
FIG. 1b is a cross-sectional view of the suction cup mounting disc.

FIGS. 1a and 1b show a suction cup mounting disc 1, in a perspective view and in a cross-sectional view, respectively. The disc 1 has a smooth, unyielding suction cup contact surface 2 creates a firm, and tight seal with a suction cup for maximum suction. A raised rim 3, annularly disposed about the contact surface 2 helps to maintain the the contact surface flat so as to provide for a tight seal and to facilitate the mounting of the suction cup by keeping it from sliding off the contact surface 2 while the user is pressing the suction cup down. An adhesive pad 4, is disposed on the bottom side 5 of the disc 1, which allows the disc 1 to be mounted on most car interior surfaces. The adhesive pad consists preferably of a foam pad provided with a self-adhesive material with which the disc 1 can be firmly attached to most any reasonably flat surface. The foam pad is part of, or firmly mounted onto, the mounting disc surface, preferably by cementing. A suction cup can then be attached to the suction cup contact surface 2 of the disc 1 whereby any article with a suction cup mounting structure can be firmly but removably attached to any surface to which the disc 1 can be attached.

Figure 2:
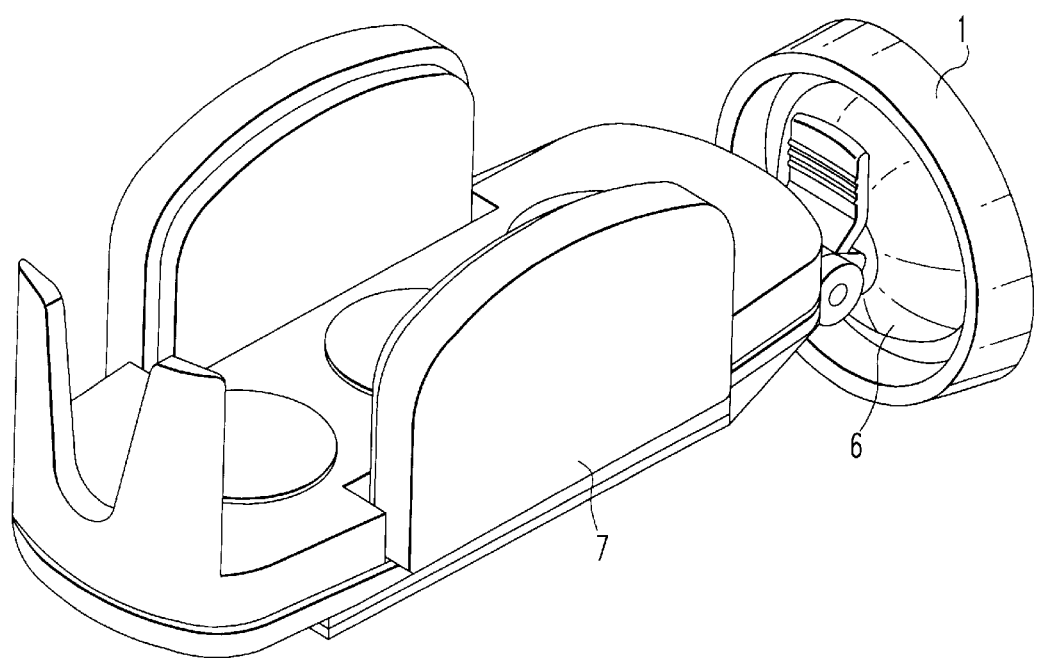
FIG. 2 shows the suction cup mounting disc with a telephone holder using a suction cup mount attached to the mounting disc.

FIG. 2 shows, for example, a cellular phone holder with a suction cup wielding structure 7. The suction cup 6 fits snugly into the mounting disc 1. Ideally, the suction cup 6 and the mounting disc 1 would be made to be compatible with each other in size, although suction cups smaller than the disc can always also be attached to the disc. Also, various disc sizes could be provided in order to accommodate various suction cups.

As pointed out, the suction cup mounting disc is preferably provided with adhesive means; However, other mounting means, for example, screws could be used to mount the mounting disc on a support surface.

Figure 3A:
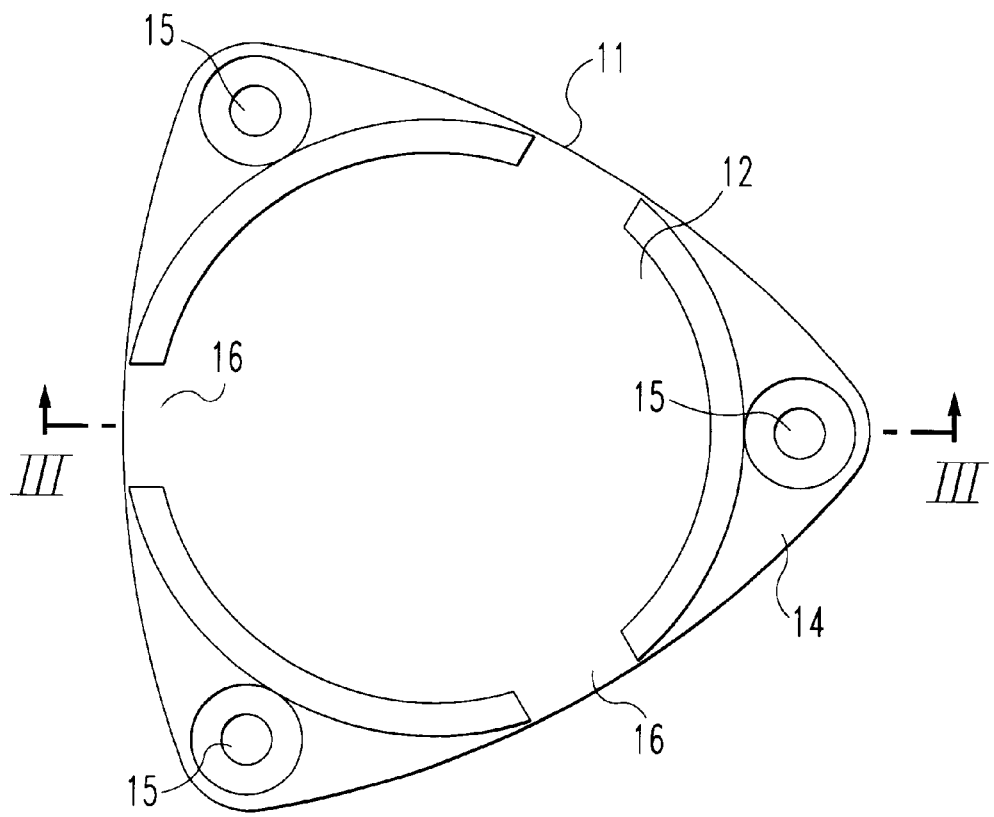
FIG. 3a is a top view of another embodiment of the suction cup holder.
Figure 3B:
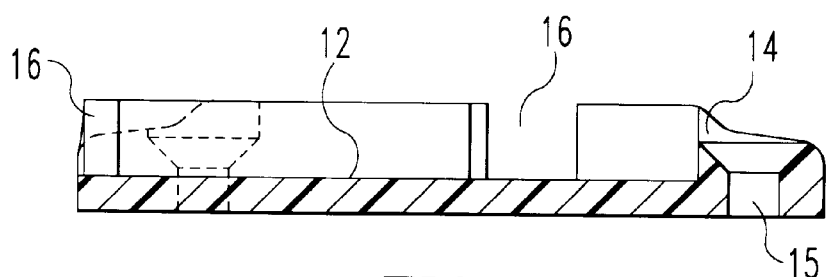

Such an arrangement is shown in FIGS. 3a and 3b. FIG. 3a is a top view of a suction cup holder with a flat bottom disc 11 provided with a raised rim 13 extending around a flat, smooth contact surface 12. The disc 11 is provided with radially projecting ears 14 having screw holes 15 extending therethrough such that the disc 11 can be mounted on any surface by means of screws extending through the screw holes 15. Three such ears 14 are shown but another number of ears, such as four, may be provided. Alternatively, a flange may extend all around the rim 13. Also, as shown in FIG. 3a, the rim 13 has preferably cutouts 16 for receiving flaps extending from the rim of a suction cup as indicated in FIGS. 3a and 3b.

Figure 4A:
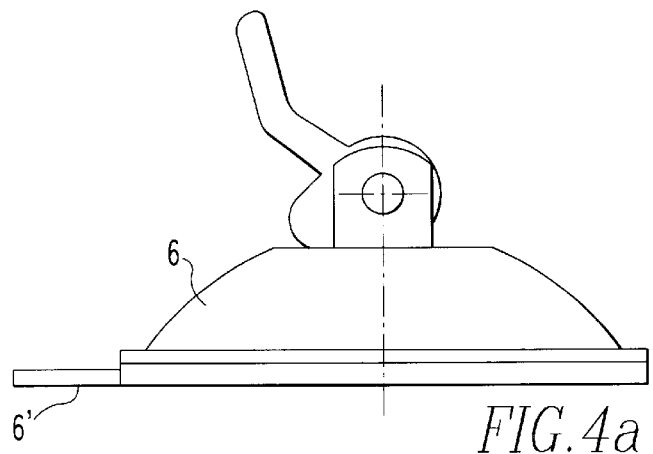
FIG. 4a shows a suction cup with a flap.
Figure 4B:
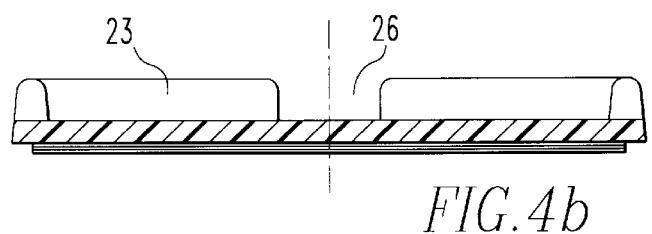
Figure 4C:
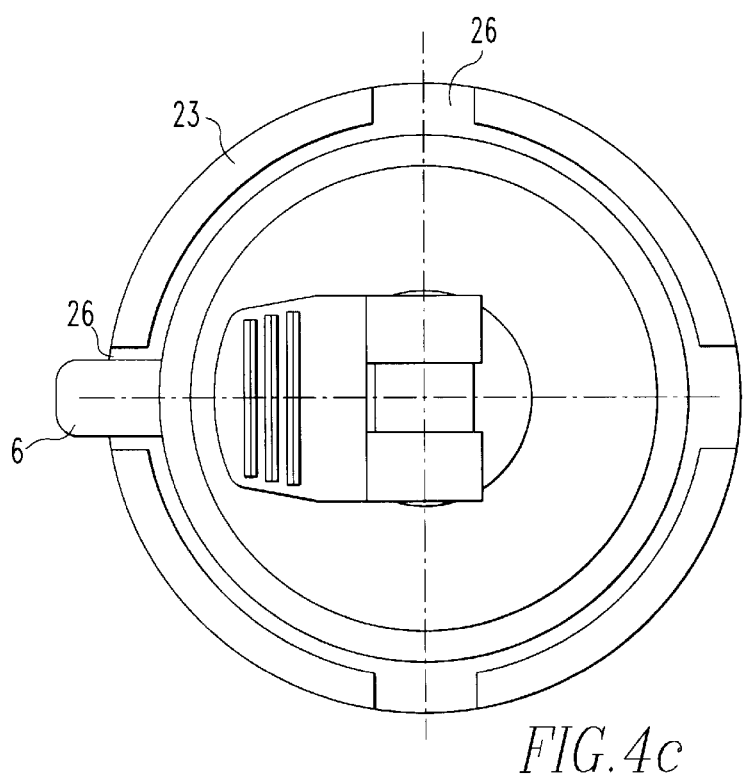
FIG. 4c is a top view of the suction cup holder of FIG. 4b with the suction cup of FIG. 1a mounted thereon.

FIGS. 4a, 4b, and 4c show essentially a suction cup mounting arrangement according to FIGS. 1a and 1b. However, the suction cup 6 has a flap 6' projecting from its circumferential edge, which flap 6' is received in cutouts 26 formed in the rim 23. In this way, the suction cup 6 can be removed by lifting the flap 6' to permit air to enter into the suction cup cavity so that the suction cup does not need to be pulled excessively for removing an article mounted by the suction cup.

FIGS. 5a and 5b show a suction cup mounting arrangement with a suction cup support plate 41 to be mounted onto a mounting plate 42. The mounting plate 42 may be provided for this purpose with an adhesive pad 4, as it is shown in FIG. 1a or with a flange structure with screw mounting holes as it is shown in FIG. 3a.

As shown in FIGS. 5a and 5b, the suction cup support plate is a flat circular plate with a number of notches 43 formed in its circumference (four are shown).

The mounting plate 42 includes circumferentially spaced retaining members 44 which project upwardly from the outer circumference of the mounting plate 42. Adjacent each of the retaining members 44, the mounting plate 42 includes openings 45 which facilitate the molding of the mounting plate 42 with the retaining members 44 and which increase the resiliency of the retaining members 44. At their top ends, the retaining members have inwardly extending projections 46, which retain the suction cup support plate 41 when it is snapped into place on top of the mounting plate 42 as shown in FIGS. 7a, 7b and 7c. In this way, the suction cup support plate 41 is supported on, and engaged with, the mounting plate 42 so as to be rotatable thereon. The retaining member 44, however, has radial protuberances 47 which are sized and arranged so as to be received in the notches 43 of the suction cup support plate 41 thereby to engage the suction cup support plate in certain angular positions. However, upon overcoming a certain retaining force, the suction cup support plate can still be rotated, with any device mounted on the suction cup support plate, to different angular positions because of the resiliency of the retaining members 44.

FIG. 7c is an enlarged detail view of the edge portions of the mounting arrangement. The numerals indicate the various features as described before.

Although, in the drawings, the mounting side for the arrangement is shown to have a flat mounting surface, the mounting surface may be curved in adaptation to curved support surfaces on which it may be mounted.

Figure 8A:
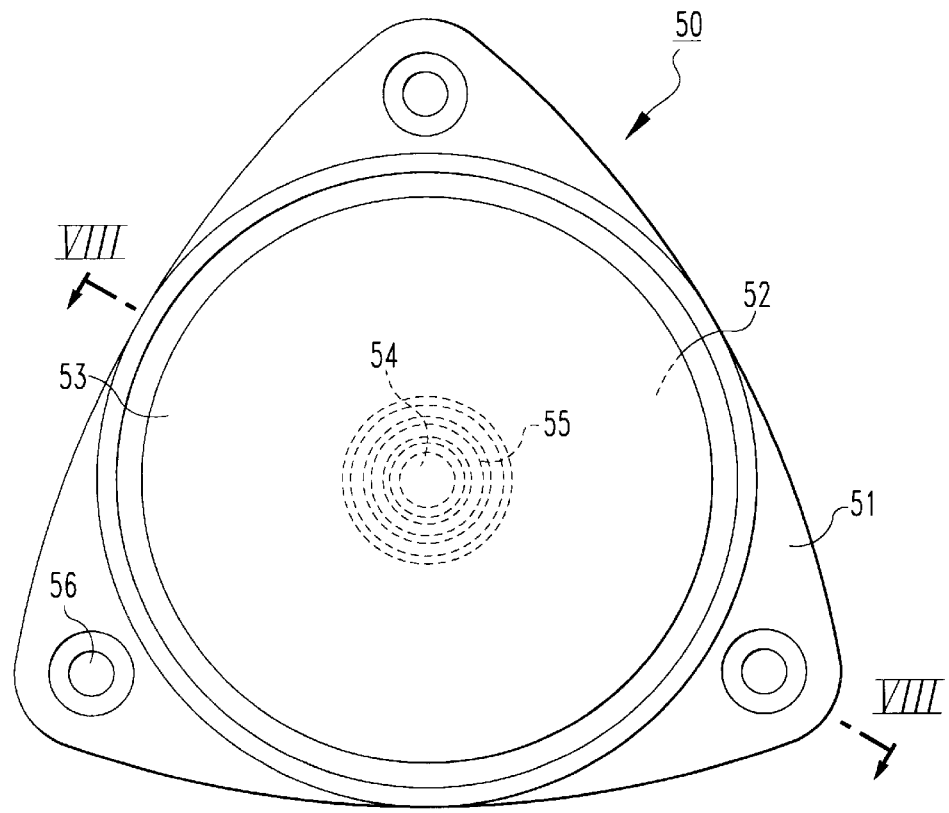
FIG. 8a is a top view of a suction cup mounting plate with mounting bolt ears and a support disc attached thereon.

FIG. 8a is a top view of a suction cup mounting disc structure 50 with a support base or plate 51 having a support surface 52. It carries a suction cup mounting disc 53 which includes a center circular section with a raised center portion 54 of concentric rings 55. The raised center portion 54 and rings 55 are used to attach the disc to the support surface 52 of the mounting disc 51. The mounting disc 51 includes at its circumference areas with screwholes 56 for mounting the disc 51 onto a mounting surface. During assembly, the mounting disc 53 is placed onto the support base 51 so that the raised center portion 54 is in firm contact with the support surface 52 of the support base 51. They are pressed together while being subjected to a high frequency voltage, whereby the rings 55 are thermally bonded to the support base 51 such that the mounting disc 53 is attached to the support base 51 only in the center section, whereby limited pivoting of the mounting disc 53 relative to the support base 51 is permitted.

This permits mounting of the cup support structure 50 onto surfaces which are not perfectly flat, or which are even curved, since the support base 51 can deform when for example mounting screws extending through mounting holes 56 are tightened down onto the curved surface. While then the support base may bend slightly, the mounting disc 53 for supporting a suction cup will remain flat as it is connected to the support base 51 only in the center thereof, thus allowing a suction cup to be securely attached to the mounting disc 53.

Figure 8C:
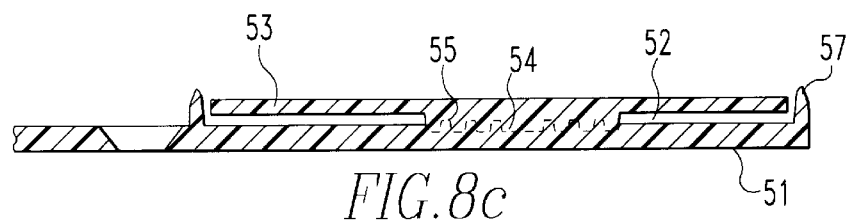
FIG. 8b is a cross-sectional view of a suction mounting plate taken along line VIII of FIG. 8a, and FIG. 8c shows another embodiment of a pivoting disc.
Figure 8C:
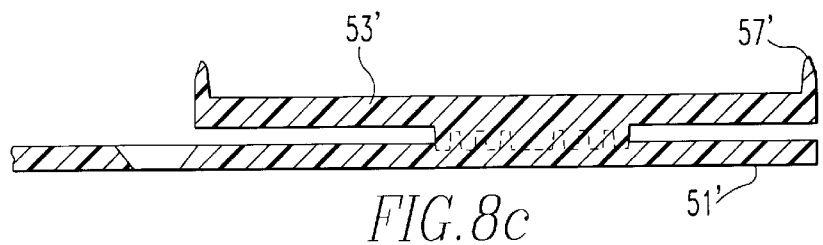

As shown in FIG. 8b the support base 51 may be provided with a rim 57 to help properly locating the suction cup on the support disc 53 but, as shown in FIG. 8c such a rim 57' may also be formed on the circumferential edge of the support plate 53' rather than the support base 51' to strengthen the suction cup suport plate 53'.

What is claimed is:

1. An assembly for supporting an article on a support surface, said assembly including:
    a) a suction cup mounting arrangement comprising:
        i) a plastic mounting disc having a first side forming a smooth, flat suction cup mounting surface and a second side opposite said first side, and a raised annular rim extending around said mounting surface said raised annular rim having at least one cut-out area; and
        ii) means for attaching said disc to said support surface, and
    b) a holder adapted to support said article, said holder comprising a suction cup attached to said mounting surface of said mounting disc, said suction cup forming a cavity and having a circumferential edge and a flap extending from said circumferential edge into one of said at least one cut-out area of said annular rim such that, by lifting said flap, air is permitted to enter said cavity of said suction cup for releasing said suction cup from said mounting surface.

2. The assembly of claim 1, wherein said means for attaching said disc to a support surface comprises a double-sided adhesive pad on said second side of said mounting disc for mounting said mounting disc on said support surface.

3. The assembly of claim 1, wherein said annular rim has an inner diameter of a size adapted to accommodate said suction cup when depressed for a tight seal between said suction cup and said mounting disc.

4. The assembly of claim 1, wherein said means for attaching said disc to a support surface includes a radially projecting flange structure with screw mounting holes extending therethrough.

5. An assembly for supporting an article on a support surface, said assembly including:
    a) a suction cup mounting arrangement, comprising a mounting plate and a suction cup support plate rotatably supported on said mounting plate and means for attaching said mounting arrangement to said support surface, and
    b) a holder adapted to support said article, said holder comprising a suction cup attached to said support plate so as to be rotatable therewith relative to said mounting plate for adjustment of the angular orientation of said article supported by said holder relative to said mounting plate.

6. The assembly of claim 5, wherein said mounting plate has axially projecting retaining members arranged around said suction cup support plate, said retaining members having projections formed at their end portion for retaining said suction cup support plate in engagement with said mounting plate.

7. The assembly of claim 6, wherein said suction cup support plate is provided at its circumference with circumferentially spaced notches and said retaining members have protuberances to be received in said notches for retaining said suction cup support plate in predetermined angular positions with respect to said mounting plate.

8. An assembly for supporting an article on a support surface, said assembly including:

a suction cup mounting arrangement comprising a mounting plate and a suction cup support plate having a top side forming a smooth flat suction cup mounting surface and a bottom side, one of said suction cup support plate and said mounting plate having a raised center portion with concentric grooves forming concentric annular projections projecting toward the other of said mounting and suction cup support plates and being thermally bonded thereto for interconnecting said plates at the center thereof to permit said suction cup support plate to remain flat even if said mounting plate is bent during mounting onto said support surface.

9. The assembly of claim 8, wherein an annular rim projects from said mounting plate closely surrounding said suction cup support plate.

10. The assembly of claim 8, wherein an annular rim projects from said suction cup support plate at the circumference thereof for surrounding a suction cup mounted on said support plate and for strengthening said suction cup support plate.

11. The assembly according to claim 8, wherein for attaching said mounting plate to a support surface, said mounting plate includes a radially projecting flange structure with screw mounting holes extending therethrough.

\* \* \* \* \*